Patented Dec. 11, 1928.

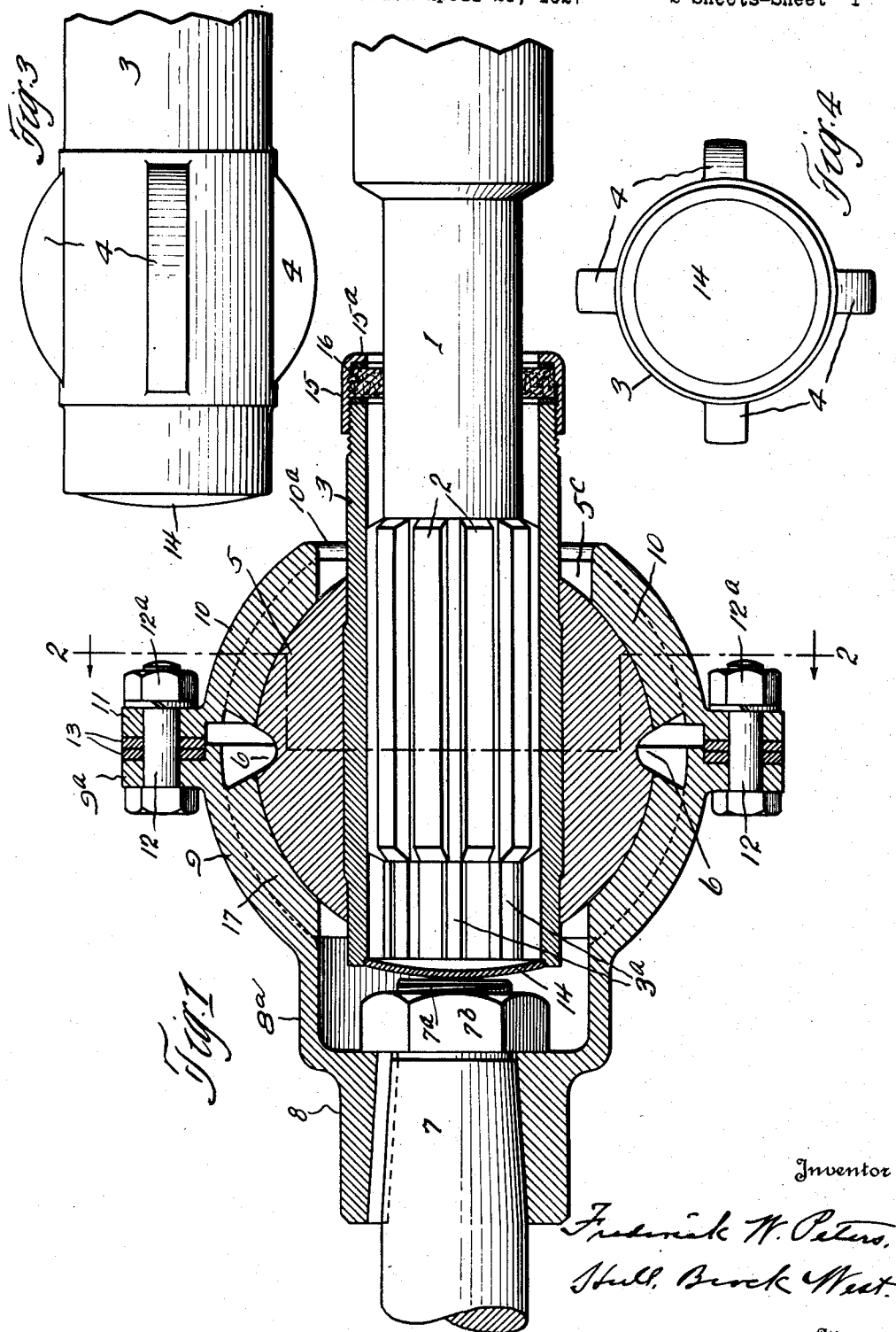

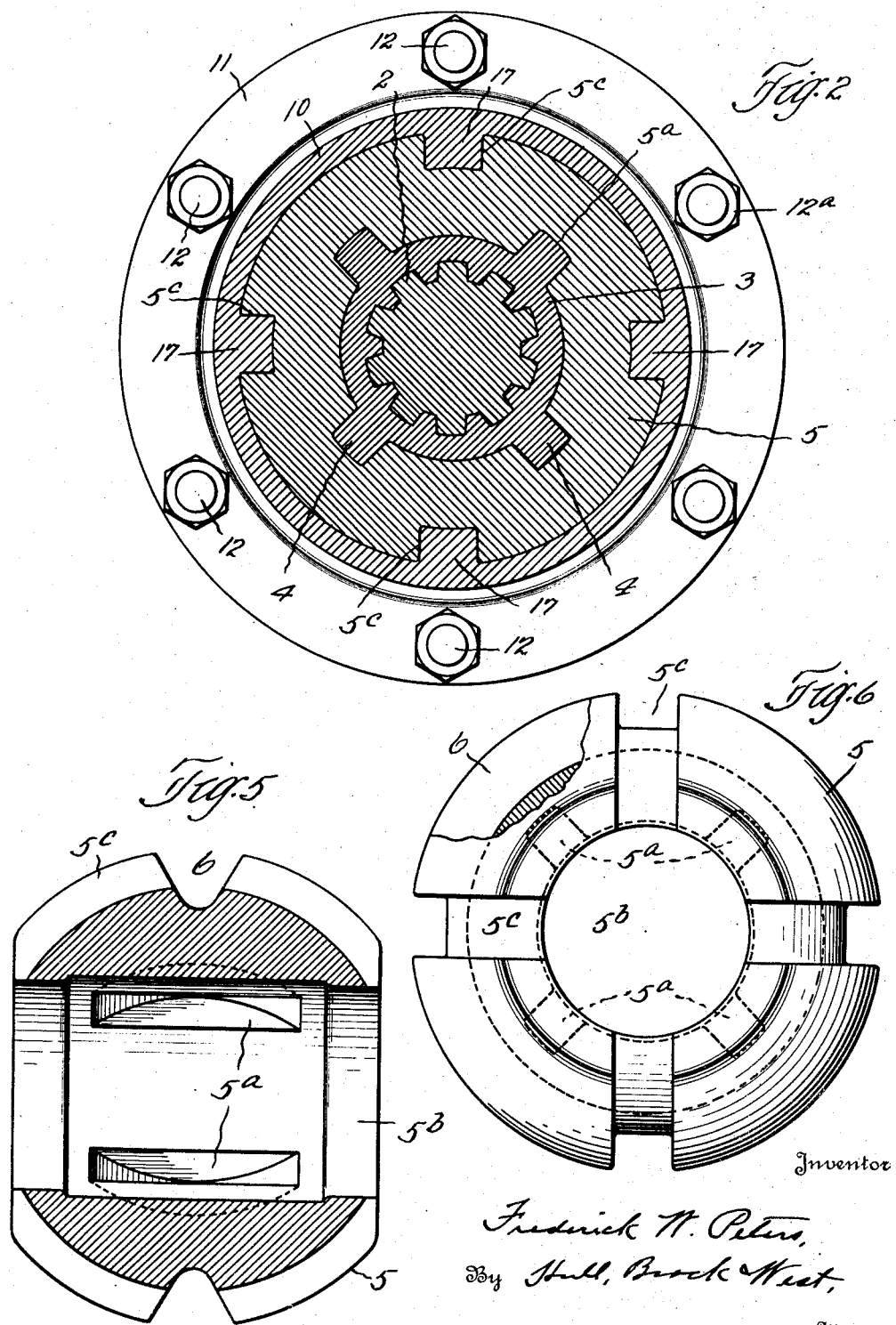

1,694,926

UNITED STATES PATENT OFFICE.

FREDERICK W. PETERS, OF CLEVELAND, OHIO, ASSIGNOR OF ONE-HALF TO EMIL GRUENFELDT, OF CLEVELAND, OHIO.

UNIVERSAL COUPLING.

Application filed April 29, 1927. Serial No. 187,469.

This invention relates to flexible couplings of the type employed in universal joints, or in structures or connections operating upon a principle analogous to that of a universal joint.

It is the general purpose and object of the invention to provide a flexible coupling of the character referred to which is simple in construction and relatively inexpensive of production.

A further object of the invention is to provide a structure of this kind wherein the joint or connection between the driving and driven shafts or members will form a central support for the adjacent end of one of said shafts or members, and especially for a spline shaft.

A further object of the invention is to provide a coupling means of the character set forth, between a driving and a driven member, wherein a body of deformable resilient material (such as rubber) is applied to one of said members and is itself received within a cup on the other member, with means for controlling the compressibility of such body and the amount of frictional engagement between the cup and the said body.

Further objects of the invention will appear hereinafter, and will be realized by the embodiment thereof shown in the drawing, wherein Fig. 1 represents a sectional view through the adjacent ends of a driving and a driven member having my coupling applied thereto; Fig. 2 is a sectional view corresponding substantially to the line 2—2 of Fig. 1; Fig. 3 a plan view of one end of the spline sleeve shown in Fig. 1; Fig. 4 an end elevation of said spline sleeve; Fig. 5 a sectional elevation of the compressible and expansible body; and Fig. 6 an end elevation of said body.

Describing the parts by reference to the drawings, 1 denotes a shaft section provided with radial spline projections 2 adapted to be received between corresponding radial spline projections 3ª within a sleeve 3. The sleeve is provided with a plurality of radially extending projections 4, shown as ribs, which are adapted to be received within grooves or recesses 5ª therefor provided within a body 5 of deformable resilient material, such as rubber. The body 5 is shown herein as spherical in shape and as having a central bore 5ᵇ for the reception of the sleeve 3, the said body being provided with an annular recess 6 extending about the circumference thereof and so arranged that a plane intersecting the central part of the groove or recess is preferably at right angles to the axis of the shaft or member 1.

7 denotes another shaft section which is connected to a hub 8 and which is pro /ided within the expanded part 8ª of said hub with a threaded end 7ª to which the nut 7ᵇ is applied. The hub is formed into a hemi-spherical cup section 9 which is adapted to receive the adjacent portion of the body 5, the exterior surface of the body and the interior surface of the section 9 being spherical in shape and engaging each other. Cooperating with the cup section 9 is a second cup section 10 the inner surface whereof is of spherical shape, the said section 10 having an aperture 10ª for the reception of the sleeve 3. This cup section is provided with a flange 11, corresponding and complementary to a flange 9ª on the section 9, and the flanges are connected by means of bolts 12 and nuts 12ª, there being one or more compressible washers 13 interposed between the said flanges.

The sleeve 3 is adapted to contain lubricant for the spline connection, one end of the sleeve being closed by a cap 14 and the joint between the opposite end of the sleeve and the shaft 1 being closed by means of a gland sleeve 15 threaded on such end of the sleeve 3, with packing material 16 interposed between such end of the sleeve and the annular flange 15ª on the gland sleeve.

With the parts constructed and arranged as described and with the bolts 12 set up to clamp the cup sections 9 and 10 against the outer surface of the body 5, motion from either of the shafts 1 or 7 will be transmitted to the other through the said cup and the said body. The groove 6 provides a channel to accommodate the stretching of one part and the compressing of the opposite part of the body 5, due to the angularity between the shafts 1 and 7.

A driving engagement between the body 5 and the shaft section 1 is effected by means of the spline projections on the said shaft and within the sleeve 3 and the engagement of the lugs or ribs 4 on the said sleeve with the complementary grooves or recesses 5ª extending outwardly from the bore of the body 5.

In addition to the frictional engagement between the cup sections 9 and 10 and the body 5, a positive driving connection may be effected between these parts by means of radially projecting recesses 5ᶜ on the body 5 which are adapted to receive correspondingly shaped ribs or projections 17 projecting inwardly from the cup sections 9 and 10.

Should it be necessary to vary the frictional engagement between the outer surface of the body 5 and the cup formed by the sections 9 and 10, this variation may be readily effected by setting up or loosening the bolts 12. The use of the compressible washers 13 enables the sections 9 and 10 to be adjusted toward each other for a considerable distance, after which, should the outer surface of the body 5 become worn, a thinner washer may be substituted for one of the washers 13.

It will be observed that, by the construction shown herein, the inner end of the shaft 1 is supported by the coupling and directly beneath the center of the same.

While the body 5 is shown as spherical in shape and the interior surface of the cup sections 9 and 10 are given a like shape, it will be evident that this shape of the said body and of the cooperating cup may be varied as desired without avoiding the spirit of my invention.

Having thus described my invention, what I claim is:

1. The combination, with a driving and a driven member, of a body of deformable resilient material surrounding an end of one of said members, the said body having a spherical outer surface and a groove extending therearound, and a cup carried by the other of said members, the said cup comprising two sections adapted to receive the outer surface of the said body therewithin, and means for drawing the said cup sections toward each other thereby to increase the frictional engagement between the same and the outer surface of said body.

2. The combination, with a driving and a driven member, of a sleeve to which one end of one of said members is splined, a substantially spherical body of deformable resilient material secured to said sleeve, a cup carried by the opposite member and engaging and substantially enclosing the said body, the said cup having an opening in one end thereof for the reception of said sleeve, the said opening being of greater diameter than the diameter of said sleeve, the said cup and the said body having interengaging projections and recesses.

3. The combination, with a driving and a driven member, of a sleeve to which one end of said members is splined, a substantially spherical body of deformable resilient material secured to said sleeve, a cup carried by the opposite member and engaging and substantially enclosing the said body, the said cup comprising two spherical members, one of which has an opening for the reception of the said sleeve, and means for adjusting the said cup members toward each other to force their inner surfaces into engagement with the outer surface of said body, the cup members and the said body having interengaging projections and recesses.

4. The combination, with a driving and a driven member, of a substantially spherical body of deformable resilient material secured to one of said members, a cup carried by the opposite member and engaging and substantially enclosing the said body, the said cup comprising two spherical sections, and means for adjusting the said cup sections toward each other to force their inner surfaces against the outer surface of said body, the cup members and the said body having interengaging projections and recesses.

5. The combination, with a driving and a driven member, of a spherical body of deformable resilient material secured to one of said members and having a circumferential groove therearound in a plane at substantially right angles to the axis of the member to which it is attached, a pair of cup sections carried by the other of said members and adapted to be applied to the outer surface of said body, the interior of the cup formed by said sections and the exterior of said body having interengaging projections and recesses and one of said sections having an opening for the reception and free play of the first mentioned member, and means whereby the said cup sections may be adjusted toward each other, thereby to increase the frictional engagement between the inner surfaces of said sections and the outer surface of the said body.

6. The combination, with a driving and a driven member, of a spherical body of deformable resilient material secured to one of said members and having a circumferential groove therearound in a plane at substantially right angles to the axis of the member to which it is attached, a pair of cup sections carried by the other of said members and adapted to be applied to the outer surface of said body, and means whereby the said cup sections may be adjusted toward each other, thereby to increase the frictional engagement between the inner surfaces of said sections and the said body.

7. The combination, with a driving and a driven member, of an elongated body of deformable resilient material secured to one of said members and having an elongated outwardly convex outer surface, and a cup carried by the other member and conforming to and engaging such outer surface.

8. In the combination recited in claim 7, the outer surface of the body and the inner surface of the cup being provided with interengaging radial ribs and recesses.

9. The combination, with a driving and a driven member, of a substantially spherical body of deformable resilient material secured to the end portion of one of said members, and a cup carried by the other member and engaging and substantially enclosing the said body and having an opening through which the end portion of the first member may pass freely.

10. In the combination recited in claim 9, the outer surface of the body and the inner surface of the cup being provided with interengaging radial ribs and recesses.

11. The combination, with a driving and a driven member, of an elongated body of deformable resilient material secured to one of said members and having an elongated outwardly convex surface, and a cup carried by the other member and conforming to and engaging such outer surface, said cup comprising a pair of cup sections and means for securing said sections together thereby to obtain a variable frictional engagement between the cup sections and the outer convex surface of said body.

12. The combination, with a driving and a driven member, of a substantially spherical body of deformable resilient material secured to the end portion of one of said members, a cup carried by the other member and engaging the outer surface of said body and substantially enclosing the same, the said cup comprising a pair of spherical sections, and means for connecting said cup sections thereby to force their inner surfaces against the outer surface of said body.

13. The combination, with a driving and a driven member, one of said members having a sleeve splined thereon, an elongated body of deformable resilient material on said sleeve and secured thereto by interlocking radial ribs and recesses, the said body having an elongated outwardly convex outer surface, and a cup carried by the other member and conforming to and engaging such outer surface, the said cup comprising a pair of cup sections, and means for securing said sections together in engagement with such outer surface.

In testimony whereof, I hereunto affix my signature.

FREDERICK W. PETERS.